Feb. 25, 1964    A. F. MANZ    3,122,629
CONSUMABLE ELECTRODE ARCLESS ELECTRIC WORKING
Filed Feb. 5, 1962    2 Sheets-Sheet 1

INVENTOR
AUGUST F. MANZ
BY
Barnwell P. King
ATTORNEY

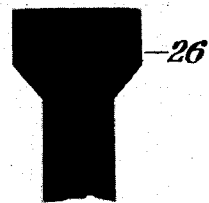
Fig. 3.
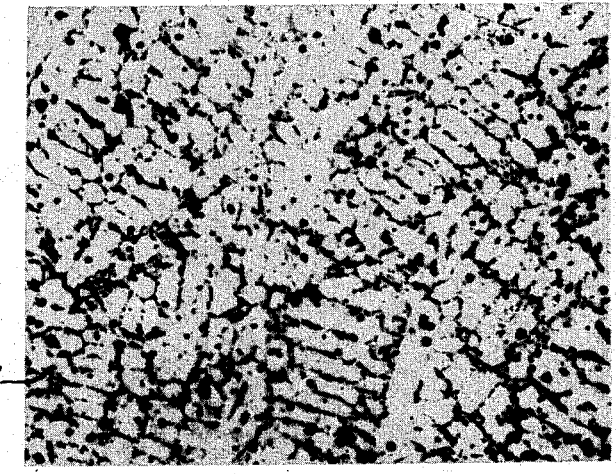
100 X
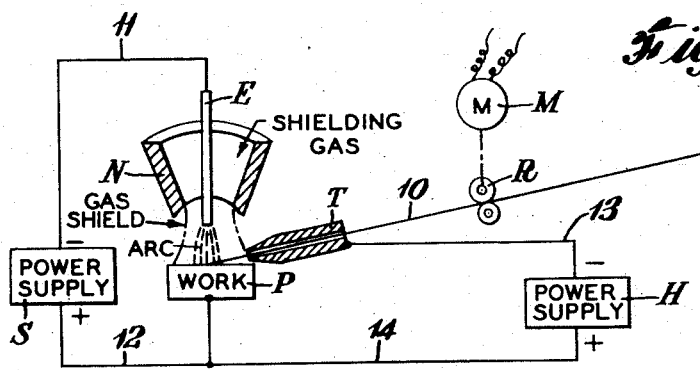
Fig. 4.
Fig. 7.
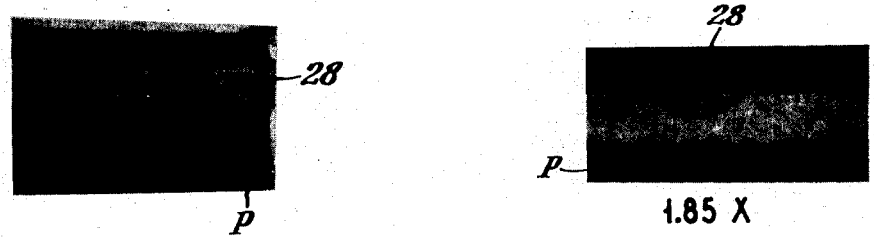
Fig. 5.
1.85 X
Fig. 6.
INVENTOR.
AUGUST F. MANZ
BY Barnwell R. King
ATTORNEY

United States Patent Office 3,122,629
Patented Feb. 25, 1964

3,122,629
CONSUMABLE ELECTRODE ARCLESS ELECTRIC WORKING
August F. Manz, Newark, N.J., assignor to Union Carbide Corporation, a corporation of New York
Filed Feb. 5, 1962, Ser. No. 170,875
6 Claims. (Cl. 219—74)

This invention relates to work-in-circuit electric working with a consumable (wire) electrode.

The invention provides a novel process of electric working which comprises forming a continuous "arcless" short circuit between work and a consumable wire electrode under a voltage sufficiently low to avoid an arc (but not necessarily some sparking), and the development of sufficient localized heat by the current of said short circuit to transfer molten metal from the end of the electrode.

According to the invention there also is provided the combination with means for applying a stream of ionized gas against a metal workpiece, of means for longitudinally feeding a wire toward such workpiece adjacent such stream of ionized gas while energizing the end of such wire with current flowing through the end of the wire so correlated with such wire feed that no arc is formed between such workpiece and the end of such wire, to thereby continuously deposit molten metal supplied by the so-fed wire on the so-heated workpiece.

In the art of electric arc welding with a continuously fed electrode, the lineal speed of any welding operation is, to a large extent, dependent upon the melt-off-rate of the electrode. For many years, it was believed that this melt-off rate of the electrode was directly proportional to to the welding current. Later developments as exemplified by the Landis et al. Patent 2,444,834, taught that the electrode melt-off rate was generally proportional to the square of the welding current. For example, melt-off rates of the electrode wire of as much as .45 lb. per minute, with corresponding increases in linear welding speeds, could be obtained using $3/64''$ to $1/8''$ diameter electrodes by imposing current densities of 60,000 amperes or more per sq. in. of electrode area on the electrode extension— that portion of the electrode between the arc end and the contact tip. Theoretically then, the electrode melt-off rate could be increased without limit by using higher and higher currents and feeding the electrode wires at correspondingly faster and faster rates. However, it was found that if the current and current densities were increased beyond certain limits, other problems soon arose; such as, undercutting of the bead, too deep penetration of the workpiece, and possibly an entire lack of fusion of the deposited weld metal with the parent metal of the workpiece.

By increasing the length of the electrode extension, much higher rates of electrode melt-off can be obtained using the same currents and current densities without the problems cited above (Landis et al. Patent 2,721,249). This may be explained by the fact that the electrode melting rate is the sum of the arc melting rate and the rate due to the $I^2R$ heating in the electrode extension beyond the contact tip. Since the increase in electrode melt-off rate due to $I^2R$ heating in the electrode extension is a function of the length of the extension, current and electrode diameter, it naturally follows that increasing the length of the extension with the same current increases the $I^2R$ heating and, thus, the electrode melt-off rate.

Thus, prior art teaches that for any given welding current and any given size of electrode wire, the melt-off rate of the electrode can be adjusted within certain limits by adjusting the length of the electrode extension. Stated in another way, if a desired melt-off rate is known and a desired penetration of the base metal is known, which determines the welding current to be used, these two factors may be properly brought into balance within certain limits by adjusting the length of the electrode extension.

Among the advantages to be derived from the above are:

(1) For any specific combination of deposition rate, base material, welding process and voltage, the current required to melt a desired amount of filler metal decreases as length of wire extension increases. This permits the use of limited-capacity power sources to achieve deposition rates previously considered unattainable or to be used in situations previously considered impractical.

(2) If welding current rather than deposition rate is held constant, then deposition rate increases sharply as length of wire extension is increased. Such increase in deposition rate is, of course, accompanied by an equivalent increase in the rate at which the electrode wire is fed into the arc.

(3) The penetration into the base metal may be reduced without impairing bond strength. This is particularly useful in cladding or surfacing operations since dilution of the metal is decreased and, hence, changes in the chemistry of the deposited metal is minimized.

(4) Permits better control of operating characteristics since metal transfer becomes more globular as the length of the electrode extension increases. This change in metal transfer results in less weld spatter than is normally encountered.

As outlined above, such control of the melt-off rate of the electrode, afforded by adjustment of the $I^2R$ heating of the electrode extension through alterations in the length of the electrode extension, and the attainment of the advantages made possible by such control, is possible within certain limitations. These limitations are due to the fact that, as mentioned earlier, in any electric welding system according to the prior art, the electrode melt-off rate is the sum of the arc melting rate and the rate due to the $I^2R$ heating in the electrode extension. Therefore, the selection of the particular combination of welding current and electrode extension to achieve the desired electrode melt-off rate must also satisfy the conditions necessary for maintaining a stable, usable welding arc in order to produce weld deposits having an acceptable weld bead contour. It is this need for maintaining a stable, usable arc from the tip of the electrode to the workpiece that imposes the limitations on the control of the electrode melt-off rate. These limitations include the following:

(1) Using any consumable electrode of a given diameter and material, there is a maximum current level that can be imposed beyond which the arc becomes unusable. That is, the weld puddle becomes very turbulent and the resulting weld bead assumes an unacceptable shape and contour. This is exemplified by the so-called "rose-budding" of the weld bead which results when too high a current level is used with aluminum electrode wires. Thus, this imposes an upper limit on the deposition or electrode melt-off rate that can be obtained regardless of what length of the electrode extension is used to increase the $I^2R$ heating effect.

(2) There is also a minimum current level in consumable electrode welding at which a stable arc will be maintained. This is commonly referred to as the transition point for a given electrode material and diameter. At this point, metal transfer becomes unstable due to the arc influence on the electrode melt-off rate. That is, the arc is no longer contributing adequately to the melt-off rate of the electrode. The total melt-off rate then becomes unstable. Thus, there is a lower limit imposed on the deposition rate that can be obtained.

In addition to this upper and lower limit imposed on the deposition rate, there are additional disadvantages inherent in any consumable electrode arc system wherein the electrode melt-off rate is dependent upon both the arc melt rate and the rate due to the I²R heating in the electrode extension. These disadvantages include:

(1) In any consumable electrode arc system, there is a certain amount of spatter taking place. This spatter not only lowers the deposition efficiency of the operation (electrode metal wasted in spatter) but also results in the need for frequent removal of the spatter from the shielding gas cup as well as from the weldment.

(2) Since the arc melt rate and melt rate due to the I²R heating of the electrode extension make up the total electrode melt-off rate, they are not completely independent, the one being influenced by the other. Therefore, it is impossible in all cases to achieve the electrode melt rate or rate of deposition that is desired and still control the heat input into the base metal. "Cold wire" addition has been a partial solution to this problem by providing better control of the heat input into the base metal. However, the deposition or melt rate of the cold wire is still a function of the arc since this is the primary source of heat.

All of the above disadvantages and limitations on the deposition rates are due to the presence of an arc. Therefore, if the arc could be eliminated, it would follow that the deposition rate would be a function of the I²R heating effect only and limitations due to the presence of the arc would be eliminated.

This has been accomplished according to the present invention wherein the surprising discovery has been made that metal deposits can be made at virtually any rate by providing sufficient energy in the form of I²R heating to melt an electrode wire continuously such that the electrode will be consumed and a constant electrode extension maintained without the presence of an arc.

The explanation for this surprising discovery that metal from a continuously fed electrode wire may be deposited at any desired rate by I²R heating of the electrode extension alone—arcless metal deposition—is given mathematically as follows.

To consume the electrode wire by I²R heating, the I²R heating must provide enough energy to melt the wire continuously. Therefore, if (1) Input energy=energy for melting the electrode will be consumed by the I²R heating and a constant electrode extension maintained without the presence of an arc.

Since (2) $\quad$ Input energy=watts=$I^2R=I^2L\,\rho/d^2\,(\pi/4)$ wherein $L$=effective length of electrode extension
$d$=diameter of electrode* (or equivalent diameter for electrodes other than round)
$\rho$=apparent resistivity of the electrode material and (3) $\quad$ Energy for melting=$HFd^2\,(\pi/4)\delta$ wherein $H$=heat content of the liquid material
$F$=electrode feed rate
$d$=diameter of electrode*
$\delta$=apparent density of the electrode material substitution of Equations 2 and 3 in (1) and solving for F and L, respectively, results in the following equations:

(4) $\quad\quad F=I^2L\,(ES)/(\pi d^2/4)^2$ (5) $\quad\quad L=F(\pi d^2/4)^2/I^2(ES)$ wherein $(ES)=\rho/H\delta$=the extension sensitivity constant= a physical constant which is dependent upon the material alone. The ES constant may be derived from published data or established experimentally as is more fully explained below.

*$\rho$=rho; $\delta$=delta.

Equations 4 and 5 provide mathematical tools for establishing the relationships between electrode feed rate F, current I, and electrode extension L necessary to continuously melt an electrode of a given diameter and material using arcless metal deposition (I²R heating only). Selection of values for any two of these variables permits solving for the third which is automatically established. Selection of current I will be limited, according to the invention, only by the operating range of the power supply to be used. Similarly, selection of the electrode feed rate will be limited only by the speed range of the feeding equipment and/or the deposition rate desired. The selection of electrode extension L will be governed by convenience only. But selection of any two automatically establishes the required value for the third for a given electrode diameter.

In the drawings:

FIG. 3 is a fragmentary view in cross-section of a casting made according to the invention;

FIG. 4 is a photograph showing the grain structure of such casting magnified 100 times;

FIG. 5 is a fragmentary plan view of a bead-on-surface weld made according to a modification of the invention;

FIG. 6 is an enlarged view in cross-section of the weld shown in FIG. 5; and

FIG. 7 is a circuit diagram of such modification of the invention in which an auxiliary heat is applied to the welding zone in addition to that supplied through the wire electrode.

Figure 1:
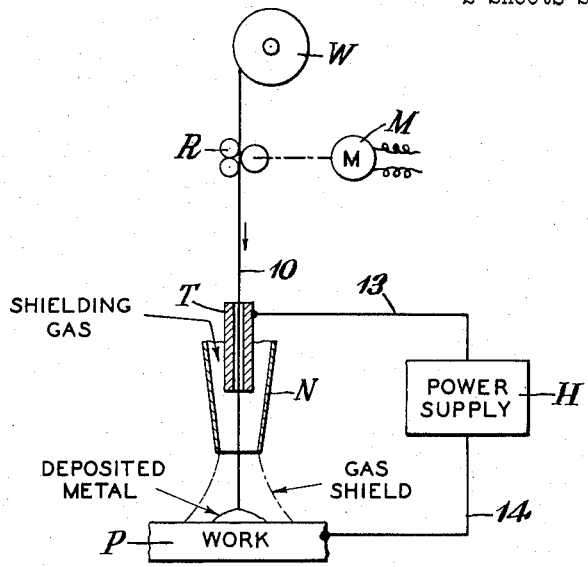
FIG. 1 is a fragmentary circuit diagram illustrating the invention.

As shown in FIG. 1 a consumable wire electrode 10 is drawn from a reel W by feed rolls R which are driven by a motor M. Such feed rolls R also drive the electrode 10 through a contact-guide tube T which is connected by a lead 13 to an electrical power supply H. The other terminal of such power supply is connected by a ground lead 14 to the work P. The tube T and electrode 10 emerging therefrom are shielded by a stream of suitable gas which flows through and is discharged by a cup or nozzle N surrounding such elements, so that the operation is shielded from the ambient atmosphere.

It is possible, for example, to pick the current I, the feed rate F, and the wire diameter D such that a constant extension L of the electrode is achieved. When such conditions are satisfied, the electrode is consumed by resistance (I²R heating) at exactly the rate at which it is being fed into the weld zone, thus maintaining a constant electrode extension.

Table I below gives values for the ES (electrode sensitivity) constant determined experimentally for three types of electrode material. These values are typical and will change, of course, with the material.

TABLE I

*Extension Sensitivity Constants*

| Material | (ES) Calculated | (ES) Measured | Curve |
|---|---|---|---|
| Ferrous alloy wire | 1.48 × 10⁻⁸ | 1.48 × 10⁻⁸ | A |
| Do | | 1.28 × 10⁻⁸ | B |
| Aluminum alloy wire | 0.375 × 10⁻⁸ | 0.458 × 10⁻⁸ | C and D |

The ES constant may be approximately determined from published data using the following definition of terms:

(1) Apparent resistivity $\rho$ is defined as $\rho$=(resistivity at melt temp.—resistivity at room temp.)÷ln** (resistivity at melt temp.÷resistivity at room temp.)

**ln=nat. log.

Such definition of $\rho$ is analogous to, but not the same as, the logarithmic mean temperature difference as used in thermal dynamics.

(2) Heat content H is the value for liquid metal raised from room temperature to its molten temperature. ("Metal Data," Hoyt, p. 488.)

(3) Apparent density $\delta$ is defined as $\delta$ = (density at melt temp. − density at room temp.)
    ÷ ln** (density at melt temp./density at room temp.)

However, in many cases, the difference between the apparent density and the density at room temperature is small. Therefore, the room temperature value will be sufficiently accurate in most cases.

*Example—High Alloy Steel*

(1) Resistivity at melting temp. is approximately
$140 \times 10^{-6}$ ohm-cm.
Resistivity at room temp. is approximately
$70 \times 10^{-6}$ ohm-cm.

$$\text{Apparent resistivity } \rho = \frac{(140-70) \times 10^{-6} \text{ ohm-cm}}{\ln(140/70)}$$
$$= 101 \times 10^{-6} \text{ ohm-cm}.$$

(2) $H = 540$ B.t.u./lb.
(3) Apparent density $\delta = 0.283$ lb./in.$^3$ therefore, by rearranging the system of units for convenience $$ES = \rho/H\delta = 1.48 \times 10^{-8} \text{ ohm-in.}^{-4}/\text{watt-min.}$$

Since the $I^2R$ deposition rate is directly proportional to the ES constant, where two electrode materials will serve the purpose, the material having the highest ES constant will provide the highest metal deposition rate.

Figure 2:
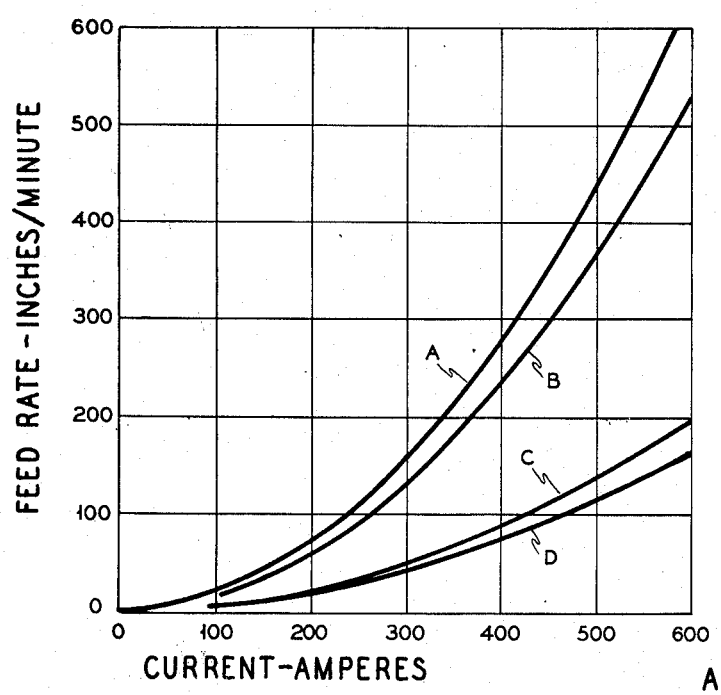
FIG. 2 is a graph of feed rate vs. current characteristic curves.

FIG. 2 shows typical calculated and measured feed rate vs. current curves which result in continuous "arcless" melting of various electrode materials with a constant visible extension of 1″ and electrode diameters of $\frac{1}{16}$″. The equations for the curves were detremined using the measured and calculated ES constant shown in Table I and an effective extension of $1\frac{1}{8}$″. The extension was assumed to be an effective $1\frac{1}{8}$″ because the current did not enter the electrode at the exact end of the contact tip with the equipment used to determine the measured data. The current actually enters the electrode inside the contact tip and hence the length of the effective extension may be substantially greater than the observed length depending upon the configuration of the contact tip used. For the contact tip configuration used in the experiments, the current is distributed such that the effective length is two electrode diameters greater than the observed length.

Although the term "arcless metal deposition" has been used to describe the $I^2R$ type of metal deposition of the invention, it is possible to observe "sparking" because of circuit electromagnetic effects. Two types of phenomena are possible with short circuiting metal transfer. In normal welding arcs, the arcing is of sufficient energy to affect the total melt rate. In contrast, the energy of sparking in $I^2R$ deposition has virtually no effect on the melt rate. However, sparking seldom occurs in $I^2R$ deposition according to the invention.

*Advantages of "Arcless" Metal Deposition According to the Invention*

(1) There is no practical upper and no practical lower limit on the deposition rate that can be achieved with arcless metal deposition for any given electrode diameter.

(2) There is no weld spatter to be removed from the shielding gas cup or weldment since there is no arc.

(3) Since the arc energy and melt rate are completely independent in arcless metal deposition, it makes possible completely separate control of metal deposition and

**ln = nat. log.

heat input into the base metal. The heat which was formerly provided by the arc to prepare the base material to receive the deposited metal (including fusing the deposited metal to the base metal, proper dilution, etc.) can be supplied by any adequate external source completely independent of the $I^2R$ heating source. Such suitable external heating sources include arcs, flames, induction heating, radiant heating, etc.

(4) Arcless metal deposition is inherently more efficient as far as power consumption is concerned.

(5) No operation skill is required with arcless metal deposition since there is no arc to be maintained at a given length, etc.

(6) Arcless metal deposition can be practiced using standard Sigma welding equipment, therefore, no special equipment is required.

(7) Arcless metal deposition makes it possible to deposit any desired amount of electrode wire with one equipment set-up, using one electrode wire size, for example, there would be no need to change wire diameters and related wire feeding equipment when different thicknesses of material are to be welded.

In addition to welding applications, arcless metal deposition according to the invention is particularly well adapted to cladding or surfacing operations and the making of metal castings and moldings.

For example, FIGS. 3 and 4 show the cross section and grain structure of a simple aluminum casting made using the arcless metal deposition of the invention. The equipment of FIG. 1 was used with the following metal deposition conditions. No shielding gas was used in making the casting. However, shielding gas may be used if desired for metallurgical reasons. It is not required for $I^2R$ operation.

| | |
|---|---|
| Power source | A constant potential power supply adjusted to its minimum open circuit voltage. |
| Electrode wire | $\frac{1}{16}$″ diameter aluminum alloy. |
| Wire feed rate | 65 i.p.m. |
| Voltage | 6½ volts. |
| Current | 325 amps. D.C. |
| Visible electrode extension | 1″. |

It may be observed when Equation 2 is divided by the current I, that (6) $\quad V = IR = IL\rho/(\pi d^2/4)$ Where $V$ = voltage drop across the extension which equals the required voltage to produce the necessary $I^2R$ heating without an arc. Thus, it is necessary to use a power supply which will not sustain an arc at the feed rates used. In other words, it is necesasry that the open circuit voltage and the volt-ampere characteristic of the power supply be such as to prevent the establishment of a stable arc at the feed rates used. A constant potential power supply whose open circuit voltage is less than 10 volts satisfies this condition. However, any power supply satisfying the above conditions may be used.

Also, as a further demonstration of the concepts discussed herein, the same equipment outlined above was used with an A.C. power supply instead of a D.C. power supply. The same type of metal deposits resulted. Since one ampere of R.M.S. alternating current is by definition equal to the current which will produce the same heating as one ampere of direct current through the same resistance, any type of power may be used for arcless metal deposition—D.C.S.P., D.C.R.P., or A.C. The type of power selected will depend upon the characteristics of the external heat source.

FIGS. 5 and 6 illustrate the type of metal deposition 28 obtained according to the invention when used for cladding or surfacing operations. The illustrated bead-on-plate was deposited using the apparatus combination, as shown in FIG. 7, of a preheating arc and arcless metal deposition of the I²R heated wire 10.

In making a bead-on-plate weld using the apparatus shown in FIG. 7, a straight polarity direct current arc is struck between the electrode E of a "tig" (tungsten-inert-gas) torch and the workpiece P. Power is delivered to the arc from welding power supply S through the electrode power cable and the ground power cable, 11 and 12, respectively.

As soon as the base material is sufficiently melted to form a puddle, the hot wire power supply H is energized and wire feed motor M is started. Wire feed motor M continuously feeds filler wire 10 into the puddle through contact tube T by means of feed rolls R. When filler wire electrode 10 contacts the puddle a circuit is completed from hot wire power supply H through conductor 13, contact tube T, filler wire 10, the workpiece, and conductor 14. Electric current flows through this circuit heating the extended portion of filler wire 10 between contact tube T and the workpiece as a result of the I²R power consumed in this portion of the circuit. The filler wire 10 is melted—in part by this I²R heating and in part by the heat radiated from the arc as well as by the heat picked up by conduction from direct contact with the molten puddle—and deposited in the weld zone. Welding progresses continuously across the joint.

In carrying out the invention an argon shielded ⅛" tungsten electrode E operating at 170 amps., 14 volts, D.C.S.P., was used to prepare the base plate P for receiving the I²R melted wire electrode 10. The I²R melted electrode 10 was deposited approximately ½" behind the arc. Working with a ¼" carbon steel base plate P, a 1/16" ferrous alloy I²R melted electrode 10 was deposited at a rate of 76 i.p.m. with a constant potential power supply of 250 amperes at 4 volts, D.C.S.P. The visible hot wire electrode extension was 1⅛".

The hot ionized gas may be supplied by a flame, or by a "mig" (metal-inert-gas) torch, as well as by a "tig" torch as above set forth by way of example. Also, the work and/or the wire may be preheated as desired without departing from the invention.

What is claimed is:

1. Process of electric working which comprises forming a continuous "arcless" short circuit between work and the end of a consumable metal electrode under a voltage sufficiently low to avoid arcing, the current of said short circuit being sufficient to melt and transfer metal from such electrode.

2. Work-in-circuit "arcless" working with a fusible metal electrode of wire, which comprises conducting electric current of sufficient value through one end of such wire to fuse the end of such wire continuously as the wire is fed toward such fusing end of the wire at a rate such that no arc is formed.

3. Electric arcless welding with a metal wire electrode, which comprises continuously feeding such wire electrode toward one end thereof at such a rate and with an electric current flowing through such wire of sufficient value to continuously melt such end without the formation of an arc subsequent to starting of such current flow.

4. Electric arcless working apparatus comprising means for continuously feeding a wire electrode toward another electrode, and means for supplying electric power to said electrodes of sufficiently high current continuously to fuse the end of said wire electrode and at a sufficiently low voltage continuously to avoid an arc between said electrodes during such fusion subsequent to the start of the operation.

5. In a work-in-circuit electric arcless welding system the combination with means for applying a stream of ionized gas against a metal workpiece, of means for longitudinally feeding a wire continuously toward such workpiece adjacent such stream of ionized gas while energizing the end of such wire with current flowing through the end of the wire so correlated with such wire feed that no arc is formed between such workpiece and the end of such wire after initiation of such current flow, to thereby continuously deposit molten metal supplied by the so-fed wire on the so heated workpiece.

6. In a work-in-circuit electric arcless welding system the combination with means for applying heat to a workpiece, of means for longitudinally feeding a consumable electrode continuously toward the so-heated workpiece while energizing the end of such electrode with current flowing through the end of the electrode so correlated with such electrode feed that no arc is formed between such workpiece and the end of such electrode after initiation of such current flow, to thereby continuously deposit molten material supplied by the so-fed electrode on the so-heated workpiece.

References Cited in the file of this patent

UNITED STATES PATENTS

| | | |
|---|---|---|
| 2,204,454 | Faunce | June 18, 1940 |
| 2,444,834 | Landis et al. | July 6, 1948 |
| 2,478,985 | Steward et al. | Aug. 16, 1949 |
| 2,526,035 | Miller | Oct. 17, 1950 |
| 2,646,492 | Ballard | July 21, 1953 |
| 2,967,927 | Weismaun | Jan. 10, 1961 |